United States Patent
Abdelkhaleq

(10) Patent No.: US 11,427,176 B2
(45) Date of Patent: Aug. 30, 2022

(54) REMOTELY ACTUATED VEHICLE PEDAL DEPRESSION APPARATUS

(71) Applicant: Shawqi Omar Amin Abdelkhaleq, Port Orange, FL (US)

(72) Inventor: Shawqi Omar Amin Abdelkhaleq, Port Orange, FL (US)

( * ) Notice: Subject to any disclaimer, the term of this patent is extended or adjusted under 35 U.S.C. 154(b) by 326 days.

(21) Appl. No.: 16/794,574

(22) Filed: Feb. 19, 2020

(65) Prior Publication Data
US 2020/0269828 A1   Aug. 27, 2020

Related U.S. Application Data

(60) Provisional application No. 62/919,036, filed on Feb. 25, 2019.

(51) Int. Cl.
*B60T 17/22* (2006.01)
*G01M 17/00* (2006.01)

(52) U.S. Cl.
CPC .......... *B60T 17/223* (2013.01); *G01M 17/00* (2013.01); *Y10S 254/05* (2013.01); *Y10S 901/30* (2013.01); *Y10T 74/2014* (2015.01); *Y10T 74/20666* (2015.01)

(58) Field of Classification Search
CPC ........ B60T 17/223; B60T 7/16; G01M 17/00; Y10S 254/05; Y10S 901/30; Y10T 74/2014; Y10T 74/20666
See application file for complete search history.

(56) References Cited

U.S. PATENT DOCUMENTS

| | | | |
|---|---|---|---|
| 1,950,640 A | 3/1934 | Twyman | |
| 2,649,814 A | 8/1953 | Brazell | |
| 3,662,593 A | 5/1972 | Pirrello et al. | |
| 3,877,318 A | 4/1975 | Castoe | |
| 4,223,649 A | 9/1980 | Robinson et al. | |
| 4,878,050 A | 10/1989 | Kelley | |
| 5,012,689 A | 5/1991 | Smith | |
| 5,299,668 A | 4/1994 | Youngers et al. | |
| 2008/0288142 A1* | 11/2008 | Ewert | B62D 1/00 701/2 |
| 2012/0187358 A1 | 7/2012 | Lee | |
| 2013/0233109 A1* | 9/2013 | Kaminski | B60T 7/06 74/469 |
| 2013/0247554 A1 | 9/2013 | Cooper et al. | |
| 2013/0284015 A1 | 10/2013 | Menten | |

FOREIGN PATENT DOCUMENTS

NL   1038608   2/2011

\* cited by examiner

*Primary Examiner* — Eric S. McCall
*Assistant Examiner* — Timothy P Graves
(74) *Attorney, Agent, or Firm* — Williams Intellectual Property; Benjamin F. Williams

(57) ABSTRACT

A remotely actuated vehicle pedal depression apparatus includes a handheld unit operatively coupled to a distal unit. Manual compression of an actuator disposed on the handheld unit effectuates extension of an extendable member forwardly from an anterior member disposed on the distal unit. Distal unit may be positioned in a footwell of an automobile to effectuate depression of a targeted pedal while a user performs observational diagnostics on the automobile without the assistance of another person.

10 Claims, 4 Drawing Sheets

REMOTELY ACTUATED VEHICLE PEDAL DEPRESSION APPARATUS

BACKGROUND OF THE INVENTION

Automobile mechanics frequently need to actuate automobile pedals during the course of their work servicing automobiles, for example to turn the engine over or to bleed brakes while performing observational diagnostics. This often requires another person to sit in the driving seat and operate the pedals upon the mechanic's command. Many diagnostic procedures require such assistance, including, for example, checking functionality of the fuel injection system, testing fuel and air intakes, monitoring effects of acceleration, determining existence of manifold leaks, testing emissions and performance of the catalytic converter, the exhaust system, the functionality and wear of belts, performance of the alternator, and checking for fluid leaks during operation of the motor at various pressures achieved across a range of revolutions per minute ("RPMs"), as well as to test the brake system and brake fluid levels across a range of pressures. Devices are seen in the art devised to enable actuation and release of targeted automobile pedals automatically, or controlled remotely, to enable a single mechanic to actuate and release a targeted pedal while actively servicing or diagnosing the vehicle, and without requiring the assistance of another person. Most include a rod or other member that extends incrementally, by action of a motorized or electric gear or rachet for example, to depress the targeted pedal when activated. Many also require attachment to a vehicle seat or steering column to stabilize the apparatus. What is needed, however, is an improved remotely operable motivator apparats that enables a standalone distal unit, remotely controllable by a handheld unit, to be stably positioned in the footwell of an automobile, without attachment to the automobile interior, that is articulable to position an anterior member to target a desired pedal across a variety of makes and models of automobiles and capable of continuously extending an extendable member in proportionate response to an actuator. The present invention, therefore, makes use of hydraulic or pneumatic cylinders to enable continuous responsivity in response to a user's hand position, as well as to enable setting an extension of the extendable member equivalent to produce a desired, set, or targeted RPM or applied pressure.

The present invention, therefore, has been devised to enable a single party to operate the pedals of an automobile remotely, while standing outside the automobile, when engaged in active diagnostics, or otherwise engaged in the scope of their work servicing an automobile, without the need of another person to assist in operating the pedals and with minimal action required to stably position the apparatus to perform the desired motivation of the targeted pedal. The present invention enables depression and release of a targeted pedal along a continuous, fluid range of positions in response to a user squeezing an actuator across an equivalent range of positions in the hand, or, alternatively, setting a desired RPM or pressure to be automatically achieved and maintained by a set extension of the extendable member.

FIELD OF THE INVENTION

The present invention relates generally to tools for automobile mechanics, and more particularly, to a remotely actuated vehicle pedal depression apparatus usable to depress and release pedals remotely whereby a mechanic servicing an automobile can operate the accelerator and brake, for example, while actively disposed outside of the vehicle performing observational diagnostics in response to the depression of the targeted pedal.

The present invention includes a handheld unit hydraulically or pneumatically coupled to a distal unit. The distal unit is positionable standalone in the footwell of an automobile. Manual engagement of a lever or trigger member on the handheld unit causes an extendable member to extend from the distal unit along a continuous range of positions to depress and release a targeted pedal of the automobile in synchrony with the manual engagement of the lever or trigger member. Thus, the mechanic is enabled to wield the handheld unit to effectuate depression of a desired pedal while actively servicing the automobile in a responsive and fluid manner.

SUMMARY OF THE INVENTION

The general purpose of the remotely extendable motivator apparatus, described subsequently in greater detail, is to provide a remotely actuated vehicle pedal depression apparatus which has many novel features that result in a remotely actuated vehicle pedal depression apparatus which is not anticipated, rendered obvious, suggested, or even implied by prior art, either alone or in combination thereof.

The term "motivator," as used herein throughout, is intended to mean an apparatus configured to enable urging of an automobile pedal forward and backward, to depress and release the pedal, such as is desirable when revving an engine or when bleeding or applying pressure to brakes. The present remotely actuated vehicle pedal depression apparatus therefore allows motivation of an automobile pedal by a user remotely located relative to the driver's seat, whereby a user outside the automobile may effectuate motivation of the pedal while servicing the automobile and without having to rely on a second party to do so. A user may therefore perform observational diagnostics on the automobile in a responsive and immediate manner, without having to switch positions or engage the assistance of a second person.

The present remotely extendable motivator apparatus, therefore, includes a handheld unit operatively coupled with a distal unit. The handheld unit is ergonomically configured to be operable singlehandedly and includes a lever or trigger configured to be squeezed in the hand. The distal unit is configured to stand positioned in the driver's side footwell in an automobile proximal a targeted pedal without additional attachment to the automobile interior. An extendable member is extendable to selectively depress and release the targeted pedal.

The handheld unit operatively communicates with the distal unit to control extension of the extendable member to engage and release the targeted pedal between a retracted and an extended position across a continuous range of positions, in fluid and continuous motion synchronized with the action of the lever or trigger.

The distal unit includes a weighted base portion, devised to stably maintain the distal unit in an erect and/or angled position in the driver's side footwell without additional attachment of the distal unit to the automobile. An anterior member, disposed atop an extendable stand pivotally securable upon the weighted base portion, is supportable across a range of positions throughout at least one axis of movement. The anterior member is therefore orientable upon the support stand and the distal unit is positionable such that the anterior member may be oriented and positioned appropriate to contact a targeted pedal. Action of the extendable member, configured to extend forwardly out from the anterior member when the handheld unit is manually engaged, enables selective and timed depression and release of the targeted pedal.

In an embodiment contemplated herein, the handheld unit is operatively coupled to, or integrated with, a master cylinder which in turn is operatively coupled to a slave cylinder, operatively coupled with, or integrated in the distal unit, by means of an interconnecting hose. In an embodiment contemplated herein, the master and slave cylinders are hydraulic. In such an embodiment, a noncompressible fluid, therefore, is communicable between the master and slave cylinders to actuate extension of the extendable member along a continuous range of positions from the retracted position to the extended position, and from the extended position to the retracted position. A user may, therefore, extend the extendable member proportionately relative to the position of the lever or trigger squeezed on the handheld unit. A range of control is therefore enabled, and the user may quickly or gradually depress and release the targeted pedal to the relative proportion signified by an associated position of the lever or trigger. Thus, a user may rev the engine, for example, by more rapidly squeezing and releasing the lever or trigger, or slowly rev up the engine by slowly squeezing the trigger all the way in, whereby the extension member slowly extends to the extended position, for example. In another embodiment contemplated herein, the master and slave cylinders are operable pneumatically to like effect.

The distal unit enables selective positioning and orientation of the anterior member. A specific pedal in the automobile may therefore be targeted. A securable pivot interconnects the support stand and the weighted base portion, allowing the support stand to be tilted conjunct the base portion and secured thereat in a tilted position along an axis of movement of generally 180° in at least one direction. The support stand is also extendable and the anterior member is pivotally connected atop the support stand to secure across a range of positions along at least one axis. Thus, the anterior member is positional to target pedals across makes and models of automobiles. In an example embodiment contemplated herein, the hose interconnecting the handheld and distal units is contemplated to be fifteen feet in length to provide sufficient distance for a user, working anywhere on the automobile exterior, to selectively engage the targeted pedal.

Thus, has been broadly outlined the more important features of the present remotely actuated vehicle pedal depression apparatus so that the detailed description thereof that follows may be better understood and in order that the present contribution to the art may be better appreciated.

Objects of the present remotely extendable motivator apparatus, along with various novel features that characterize the invention are particularly pointed out in the claims forming a part of this disclosure. For better understanding of the remotely extendable motivator apparatus, its operating advantages and specific objects attained by its uses, refer to the accompanying drawings and description. It should be understood that the following description of the associated figures presented herein is not intended to be limiting, but rather to present example embodiments within the intended scope and apprehension of a person of ordinary skill, whereby deviations in form and differences between associable embodiments may be appreciated.

BRIEF DESCRIPTION OF THE DRAWINGS

Figures

DETAILED DESCRIPTION OF THE DRAWINGS

With reference now to the drawings, and in particular FIGS. 1 through 7 thereof, example of the instant remotely actuated vehicle pedal depression apparatus employing the principles and concepts of the present remotely actuated vehicle pedal depression apparatus and generally designated by the reference number 10 will be described.

Figure 1:
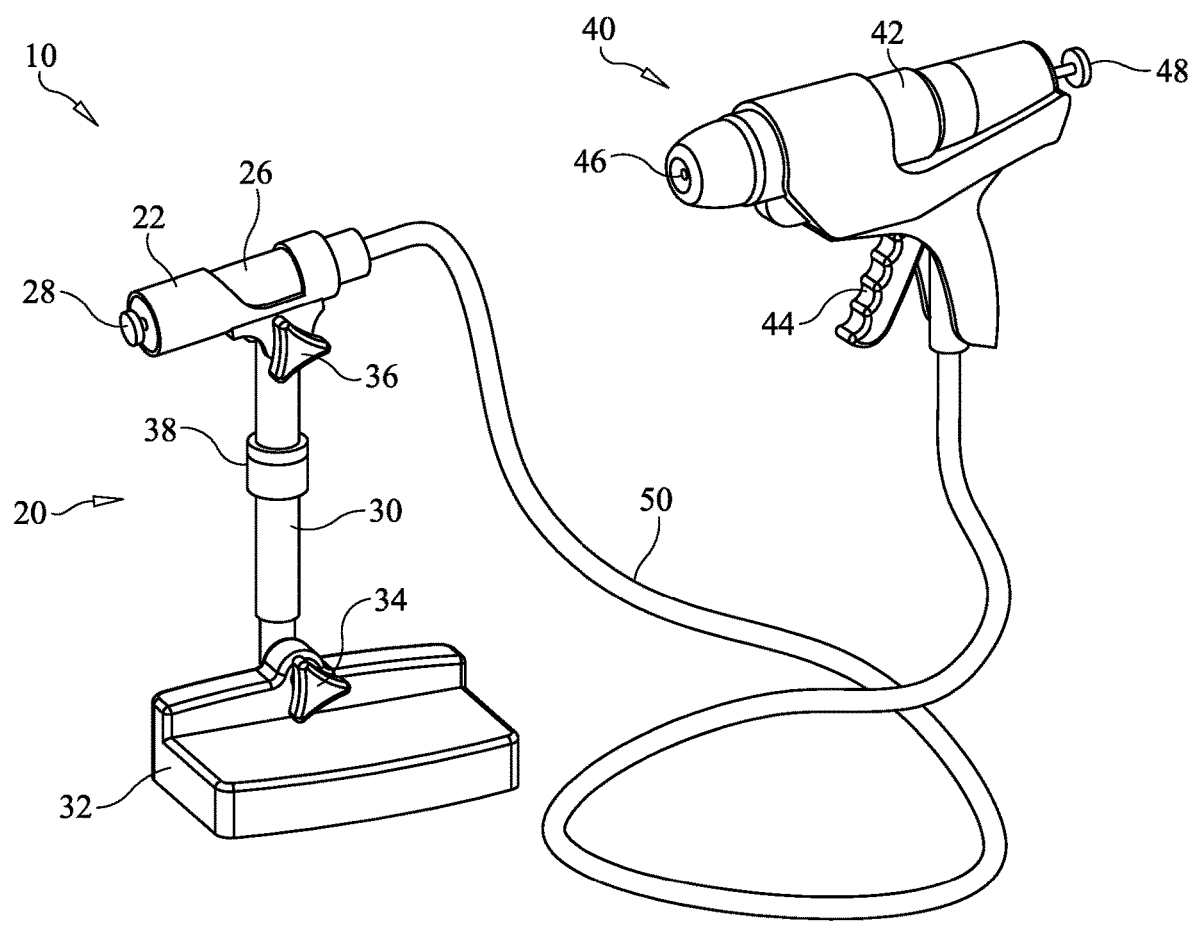
FIG. 1 is an elevation view of an example embodiment of the apparatus having a distal unit and a handheld unit.

FIG. 1 illustrates an example embodiment of the remotely actuated vehicle pedal depression apparatus 10. Distal unit 20 includes an anterior member 22 pivotally securable atop an extendable stand 30. Slave cylinder 26 is disposed in anterior member 22 operatively coupled to extendable member 28, which is devised to forwardly project from anterior member 22. Handheld unit 40 includes master cylinder 42, connected to slave cylinder 26 by means of hose 50, whereby hydraulic or pneumatic pressure operationally controls the extension and retraction of extendable member 28 between a retracted position and an extended position in response to manual activity at actuator 44 on the handheld unit 40.

Figure 2:
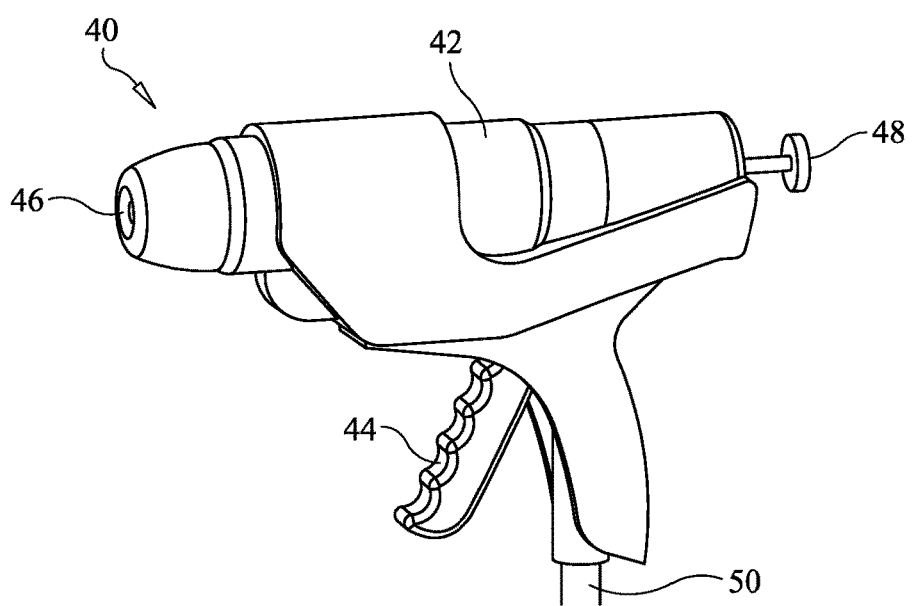
FIG. 2 is an elevation view of an example embodiment of the distal unit secured at an incline by means of a lower pivot securing an extendable stand
Figure 3:
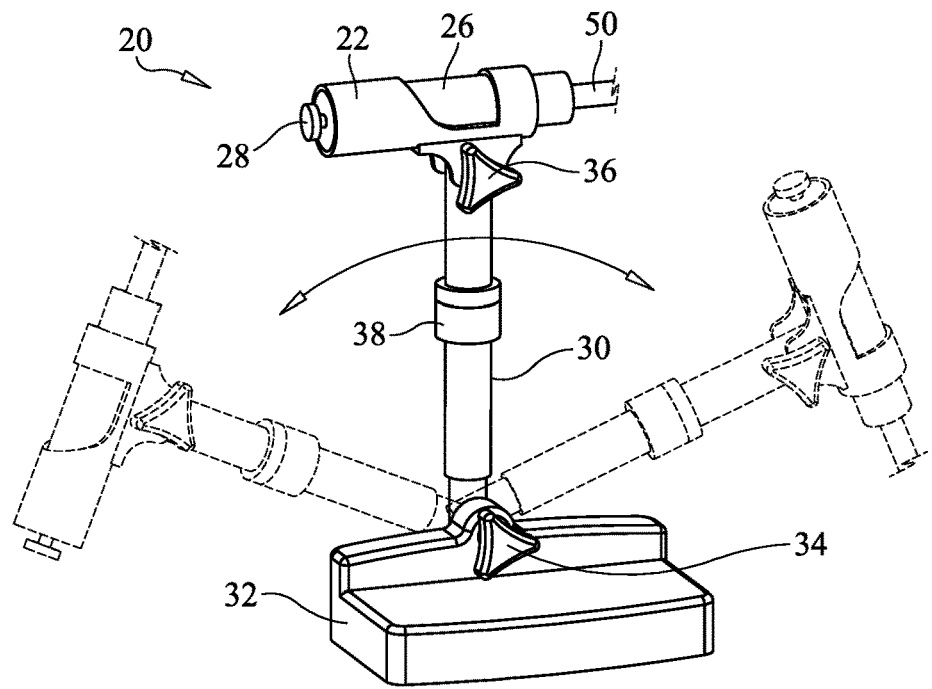
FIG. 3 is an elevation view of an example embodiment of an anterior member, disposed atop the extendable stand, secured at an angled position by action of a securable upper pivot.

Extendable stand 30 is pivotally securable atop weighted base portion 32, which is configured to stabilize anterior member 22 in an erect position, or at a position extended and angled from weighted base portion 32 (as shown for example in FIGS. 2 and 3). Extendable stand 30 is securable upon lower pivot 34 thorough 180°, in at least one direction. Upper pivot 36 is configured to secure anterior member 22 through a range of positions along at least one axis. Extendable stand 30 is telescopic and may be extended to, and secured at, a greater length by means of screw-clamp 38. See for example FIGS. 2 and 3.

Extension of extendable stand 30 from a retracted position and an extended position and securement of the extendable stand 30 and anterior member 22 angled about lower and upper pivots 34, 36, enables a user to position and orient anterior member 22 for use with different automobiles. Weighted base portion 32 maintains upright position of distal unit 20 in a driver's side footwell of the automobile, and anterior member 22 is therefore orientable to contact the accelerator or brake pedal therein, by means of lower and upper pivots 34, 36 and extendable stand 30.

Handheld unit 40 includes actuator 44 that is manually operable to control extension and retraction of extendable member 28 forwardly extendable from anterior member 22. Handheld unit 40 is therefore operable to effectuate depression and release of an automobile pedal by a user disposed outside the automobile. The user, standing outside the automobile, may therefore prime brakes or rev an engine without the need of assistance from another person. See for example FIG. 7.

FIG. 2 is a side elevation view of an example embodiment of handheld unit 40. In this example embodiment, handheld unit 40 is disposed in the general form of a gun. Actuator 44 is disposed as a trigger or lever ergonomically configured for compression in the hand of a user. Handheld unit 40 includes a flashlight 46 anteriorly disposed to assist in visibility when operating the apparatus 10 and viewing engine parts or brakes, for example. Manual control 48, disposed posteriorly upon the handheld unit 40, is usable to set and control a desired extension of extendable member 28 whereby a desired revolutions per minute ("RPM") may be automatically attained and maintained when actuator 44 is engaged, for example. Manual control 48 is also usable to set a desired extension of extendable member 28 to apply a desired pressure to a brake pedal, for example. The user is therefore able to use manual control 48 to set a desired extension of extendable member 28 and then effectuate achievement of that extension to test a desired RPM or brake pressure, for example without having to specifically monitor the RPMs or pressure.

In one example embodiment, master and slave cylinders 42, 26 are configured to be hydraulic. In another example embodiment contemplated herein, master and slave cylinders 42, 26 are configured to be pneumatic. Incremental or continuous movement of actuator 44 lever or trigger, from a first position to a second position, is adapted to extend extendable member 28 from anterior member 22 incrementally or continuously, from a retracted position to an extended position. Thus, compression and release of the actuator 44 lever or trigger incrementally or continuously extends or retracts extendable member 28 incrementally or continuously from the extended position to the retracted position. The user may therefore correspond the position of the actuator 44 trigger or lever with a desired RPM or brake pressure and can proportionately continuously or incrementally increase or lower said RPMs or brake pressure, as desired, when performing observational diagnostics on the automobile.

Figure 4A:
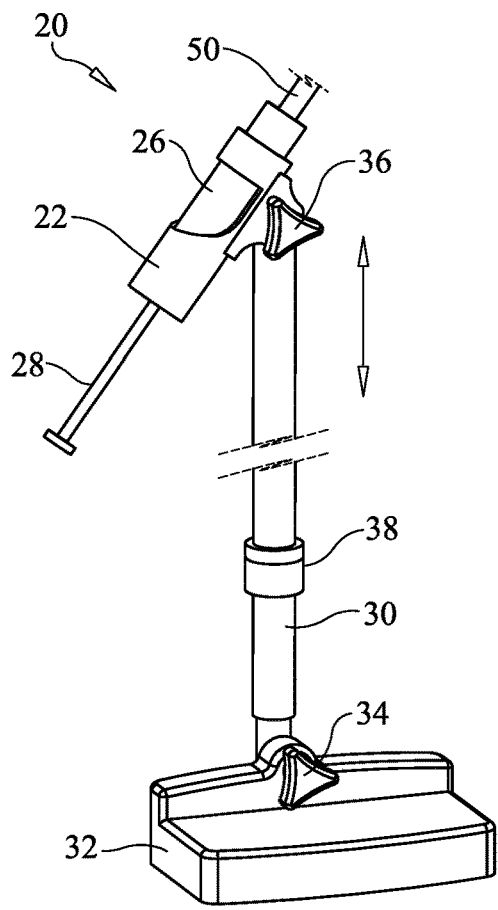
FIG. 4 is an elevation view of an example embodiment of a handheld unit
Figure 4B:
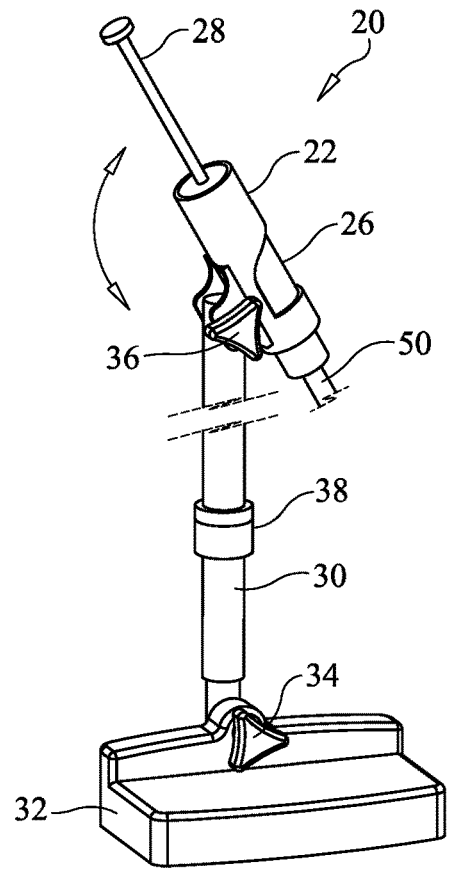

FIG. 3 illustrates an example embodiment of a range of motion of lower pivot 34 in securably positioning anterior member 22 atop extendable stand 30. FIG. 4 illustrates an example embodiment of a range of motion of upper pivot 36 in securably orienting anterior member 22 atop extendable stand 30. Upper and lower pivots 34, 36 are loosenable and securable by manual action at an associated handle member to maintain position of each of extendable stand 30 and anterior member 22 between the illustrated range of positions thereby enabling appropriate position of anterior member 22 for use across a variety of makes and models of automobiles. Weighted base portion 32 is devised to have a mass sufficient to support extendable stand 30 at its extended position and anterior member 22 across the range of positions enabled by action of the upper and lower pivots 34, 36.

Figure 5:
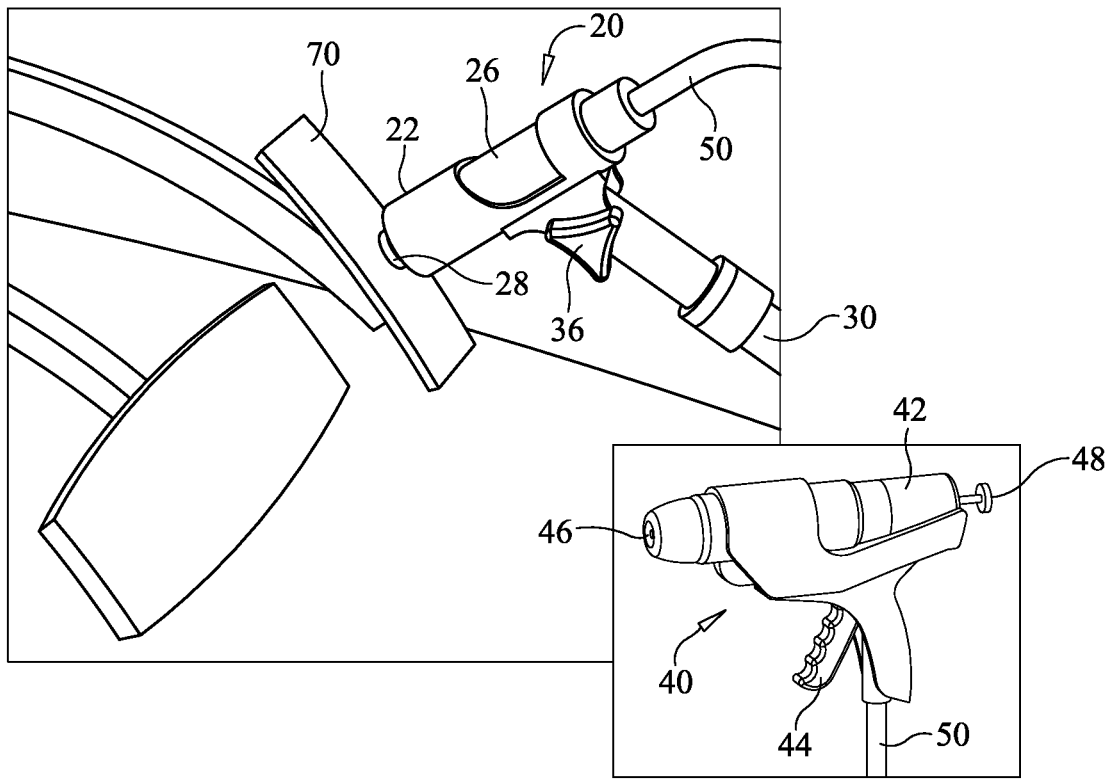
FIG. 5 is an elevation in-use view of an example embodiment of a distal unit having an extendable member disposed at a retracted position.
Figure 6:
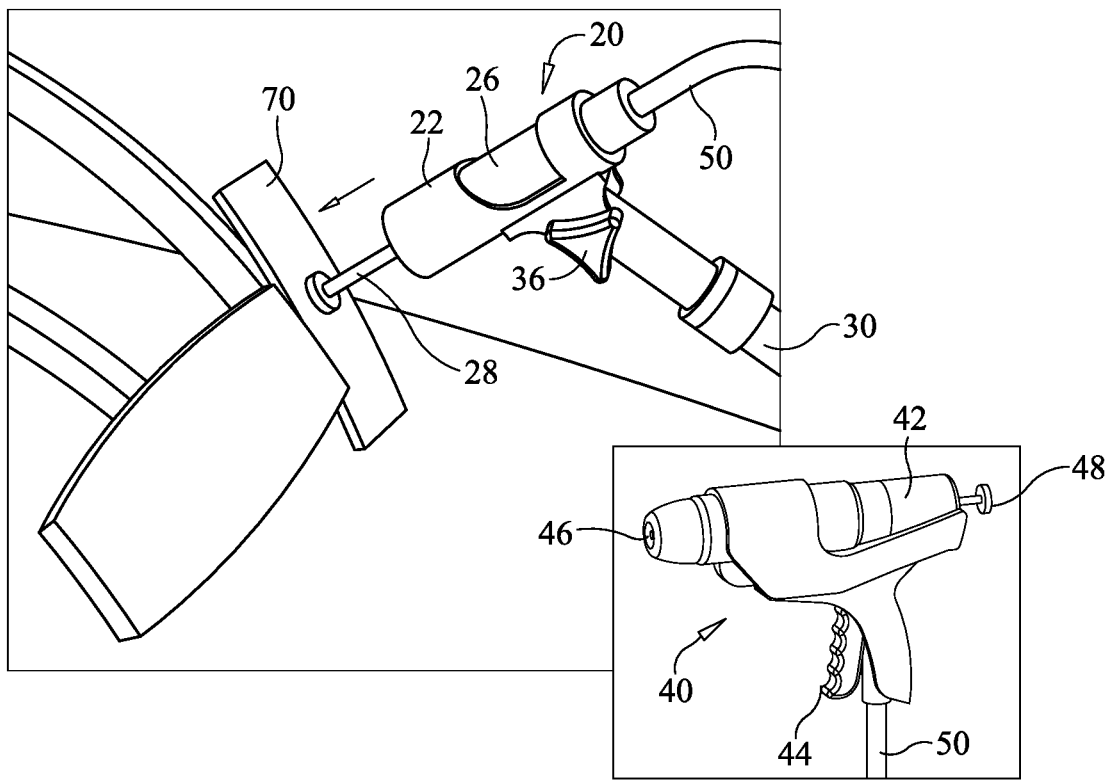
FIG. 6 is an elevation in-use view of an example embodiment of the distal unit having the extendable member disposed at an extended position.

FIGS. 5 and 6 are detail views of anterior member 22 in-use with a targeted pedal 70. In this example shown, targeted pedal 70 is an accelerator. FIG. 5 shows anterior member 22 with extendable member 28 disposed in the retracted position. It should be noted by a person of ordinary skill that anterior member 22 could be secured in a position depressing pedal 70 some, even with extendable member 28 in the retracted position to maintain a base level RPM, as desired. Alternatively, anterior member 22 may be positioned in contact with pedal 70 such that pedal 70 is not depressed until extendable member 28 is extended, either to a set extension (pursuant to a setting afforded by manual control 48), to the extended position, or somewhere in between by use of the actuator 44 on handheld unit 40, continuously relaying an equivalent extension proportionately in response to the actuator 44 position in the hand of the user. FIG. 6, therefore, illustrates extendable member 28 depressing pedal 70 some, in response to compression of the actuator 44 on the handheld unit 40 (see inset of FIGS. 5 and 6).

Figure 7:
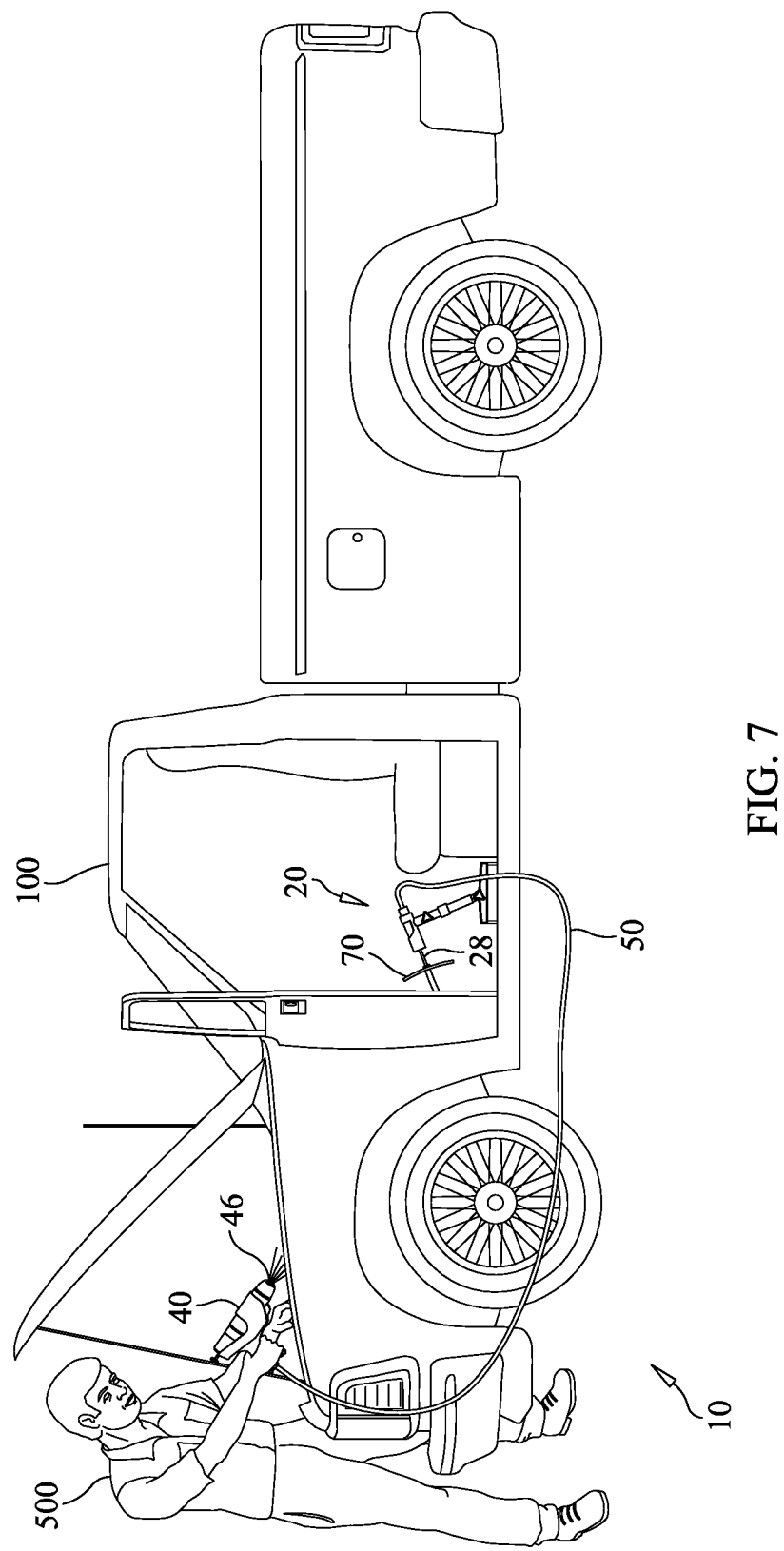
FIG. 7 is an elevation view of an example embodiment of the apparatus in-use by a user effectuating revving of an engine of an automobile while observing the engine.

FIG. 7 shows the apparatus 10 in-use in an automobile 100. User 500 is applying the actuator 44 on handheld unit 40 to effectuate depression of pedal 70 while performing observational diagnostics single-handedly on the automobile 100 engine. Flashlight 46 is illuminated to assist visibility of the observational diagnostics.

What is claimed is:

1. A remotely actuated vehicle pedal depression apparatus comprising:
    a distal unit positionable proximal a pedal in an automobile, said distal unit having an anterior member orientable to direct an extendable member, extendable and retractable from the anterior member, to contact and depress the pedal, said distal unit comprising:
        a weighted base portion configured to stabilize the anterior member in an erect position;
        an extendable stand pivotally connected atop the base portion, said extendable stand securable thorough 180° in at least one direction;
        a securable pivot atop the extendable stand configured to secure the anterior member throughout a range of positions; and
    a handheld unit disposed in operational communication with the distal unit, said handheld unit having an actuator that is manually operable to control extension and retraction of the extendable member;
    wherein the distal unit may be stood in an automobile in a driver's side foot well and the anterior member is securable in an orientation appropriate to depress and release the accelerator pedal by action of the extendable member and wherein the handheld unit is operable to effectuate depression and release of the automobile accelerator pedal by a user disposed outside the automobile.

2. The handheld unit of claim 1 wherein the actuator is a lever or trigger ergonomically configured for compression by the user's fingers.

3. The remotely actuated vehicle pedal depression apparatus of claim 2 wherein incremental or continuous movement of the lever or trigger from a first position to a second position extends the extendable member from the distal unit incrementally or continuously from a retracted position to an extended position and wherein release of the lever or trigger incrementally or continuously from the second position to the first position retracts the extendable member incrementally or continuously from the extended position to the retracted position.

4. The remotely actuated vehicle pedal depression apparatus of claim 3 further comprising:
    a master cylinder operatively coupled with the handheld unit;
    a slave cylinder operationally coupled with the distal unit in operational communication with the master cylinder; and
    a hose interconnecting the master and slave cylinders;
    wherein engagement of the lever or trigger extends the extendable member by operational communication between the master and slave cylinders.

5. The remotely actuated vehicle pedal depression apparatus of claim 4 wherein the master and slave cylinders a hydraulically operated.

6. The remotely actuated vehicle pedal depression apparatus of claim 4 wherein the master and slave cylinders are pneumatically operated.

7. The remotely actuated vehicle pedal depression apparatus of claim 5 wherein the handheld unit further comprises a manual control operable to automatically effectuate a set extension of the extendable member when the actuator is engaged.

8. The remotely actuated vehicle pedal depression apparatus of claim 6 wherein the handheld unit further comprises a manual control operable to automatically effectuate a set extension of the extendable member when the actuator is engaged.

9. The remotely actuated vehicle pedal depression apparatus of claim 7 wherein the handheld unit further includes a flashlight.

10. The remotely actuated vehicle pedal depression apparatus of claim 8 wherein the handheld unit further includes a flashlight.

* * * * *